July 13, 1965

J. L. HAGER 3,194,540

HOMOGENIZING APPARATUS

Filed July 28, 1961

INVENTOR.
JOHN L. HAGER
BY
Attorney

July 13, 1965   J. L. HAGER   3,194,540
HOMOGENIZING APPARATUS
Filed July 28, 1961   4 Sheets-Sheet 2

INVENTOR.
JOHN L. HAGER
BY
Attorney

July 13, 1965 J. L. HAGER 3,194,540
HOMOGENIZING APPARATUS
Filed July 28, 1961 4 Sheets-Sheet 3

*INVENTOR.*
JOHN L. HAGER
BY

INVENTOR.
JOHN L. HAGER

United States Patent Office 3,194,540
Patented July 13, 1965

3,194,540
HOMOGENIZING APPARATUS
John L. Hager, Buffalo, N.Y., assignor, by mesne assignments, to Liberty National Bank and Trust Company, Buffalo, N.Y.
Filed July 28, 1961, Ser. No. 127,531
9 Claims. (Cl. 259—7)

This invention relates to homogenizing apparatus, and more particularly to apparatus for homogenizing and blending milk, oils, fruit slurries, etc.

For the proper homogenization of milk, or for emulsification of oils, or for satisfactory blending of fruit slurries, it is essential that the fluid material be passed through a device which will bring about a reduction in particle size. Moreover, the quality or effectiveness of such homogenization, emulsification or blending, will depend not only upon the ultimate particle size but also upon the uniformity of reduction in particle size.

Most of known homogenizing, emulsifying, and blending apparatus require considerable space and unreasonably long time cycles for reducing the particles to a desired size. In one of the most commonly employed types of apparatus, for instance, a paddle or agitator is immersed in an open tank containing the fluid to be homogenized or emulsified. The open tank has usually to be rather large so that a substantial batch or quantity of fluid may be subjected to the rotating paddle or agitator at one time. However, because of the very size of the tank, homogenization is considerably retarded, particularly as a result of the tendency of the paddle or agitator to create a vortex at the center of the tank. Because of the vortex relatively small quantities of fluid are subjected to a high speed blending action adjacent the vortex, while the larger quantities remote from the vortex are being rotated or blended at much lower speeds. Much of the energy imparted by the agitator or blending head to the liquid is thus inefficiently expended by the creation of the vortex; and the vortex in turn results in a non-uniform and slow rate of homogenization or emulsification. Moreover, conventional homogenizing apparatus of the open, paddle tank type generally depend upon mere agitating or mixing of a fluid to produce a reduction in the size of the particles in the fluid. Furthermore, the open paddle-tank type of apparatus is not conducive to a continuous flow process since a given volume or batch of the fluid must be retained in the paddle tank until the homogenization or emulsification thereof is complete. An increase in operating speed usually results in objectionable temperature rises within the homogenizing unit, as well as increasing the wear and tear thereon.

With conventional continuous-flow homogenizing, emulsifying or blending apparatus, on the other hand, there is the disadvantage that although the uniformity of particle size may be controlled by regulating the rate of flow of the fluid through a respective unit, it is often necessary, since most units require pumping means separate from the homogenizing apparatus for pumping the fluid to the latter, to install additional means to regulate and coordinate the rate of flow of fluid through both the pump and the homogenizing apparatus.

Further objections to prior homogenizing units include the difficulties encountered in the assembly and cleaning of the units, and inability to use interchangeable homogenizing elements for homogenizing or blending fluids of different particle size.

An additional objection to contemporary homogenizing units is inability to recirculate a portion of the fluid in the unit.

One object of this invention is to provide apparatus for homogenizing, emulsifying or blending, which will be more rapid and efficient in operation than prior apparatus of this kind.

Another object of the invention is to provide apparatus of the character described which will not only be faster than prior apparatus for the purpose, but which will achieve greater uniformity in particle size.

Another object of this invention is to provide a closed homogenizing unit in which liquid in relatively small quantities may be confined and subjected to uniform homogenization.

A further object of this invention is to provide an improved homogenizing apparatus which incorporates both fluid pumping means and fluid homogenizing means in a single, compact unit.

Another object of this invention is to provide a high speed pumping and homogenizing unit having a closed chamber through which liquid is drawn and in which the particles in the liquid are subjected to both positive shearing and high frequency implosion to provide maximum uniformity of particle size in the mixture.

Still another object of this invention is to provide a combined fluid pumping and homogenizing unit wherein the homogenizing portion of the unit includes particle shearing elements moving at a constant speed, and wherein the rate of flow of fluid through said unit and the uniformity in the reduction of particle size is controllable by valve means positioned at the outlet of the unit.

A more specific object of this invention is to provide a unit of the character having pumping means and particle shearing means, and wherein a portion of said shearing means is adjustable relative to the pump casing to permit recirculation of fluid through the shearing elements.

A still further object of this invention is to provide a unit of the character described having removable shearing elements which may be easily removed from the pump and replaced by similar but differently sized elements.

Other objects of the invention will be apparent hereinafter from the specification and from the recital of the appended claims, particularly when read in conjunction with the accompanying drawings.

In apparatus built according to the present invention, a pump and a shearing element are built into the same unit. This not only achieves compactness but many other advantages as well.

By incorporating both fluid pumping means and homogenizing means in the same unit it is possible to subject small quantities of fluid to an extremely high number of positive shearing actions per minute; and the number of shearing cuts per minute afforded to a given volume of fluid in the unit may be varied merely by employing a simple valve means at the outlet of the unit rather than altering the operating speed of the unit.

Furthermore, in the apparatus of the present invention the particles are subjected to positive shearing action by pumping the fluid through a closed system containing slotted shearing elements, which are rotated at high speed. Not only do the elements positively shear particles in the fluid and achieve reduction of the particles to a uniform size rapidly, but their high speed operation results in high frequency sound waves, measurable in kilocycles per second which cause an implosion and serve to break down, disperse and blend the particles in sizes of 50 microns and less. By incorporating the pumping and homogenizing means within the same unit, it is also possible to provide recirculating means within the unit so that at least part of the fluid is passed through the homogenizing elements several times before passing completely through the unit. This recirculating effect further increases the number of shearing cuts to which a given volume of fluid will be subjected during its flow through the pump and thus further refines the product.

3

Figures 9, 10, 11:
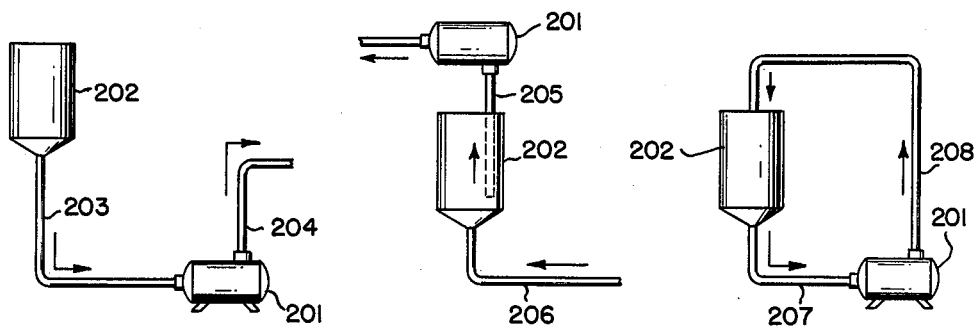
Figure 7:
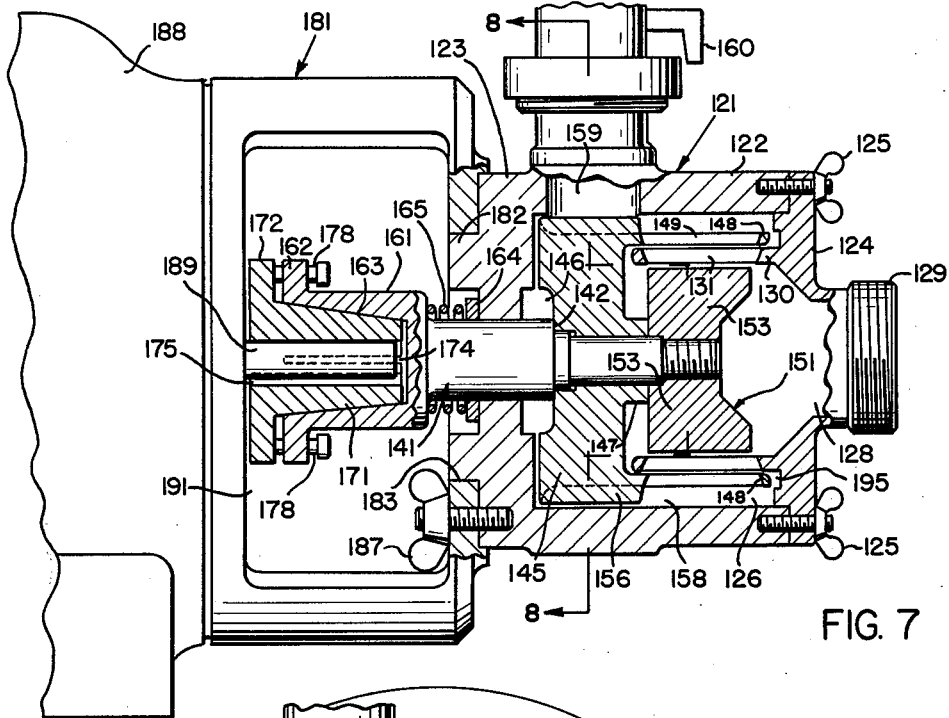
FIG. 7 is a side elevational view which is partly broken away in part and which illustrates a still further novel combination of fluid pumping and homogenizing apparatus made according to this invention.
Figure 8:
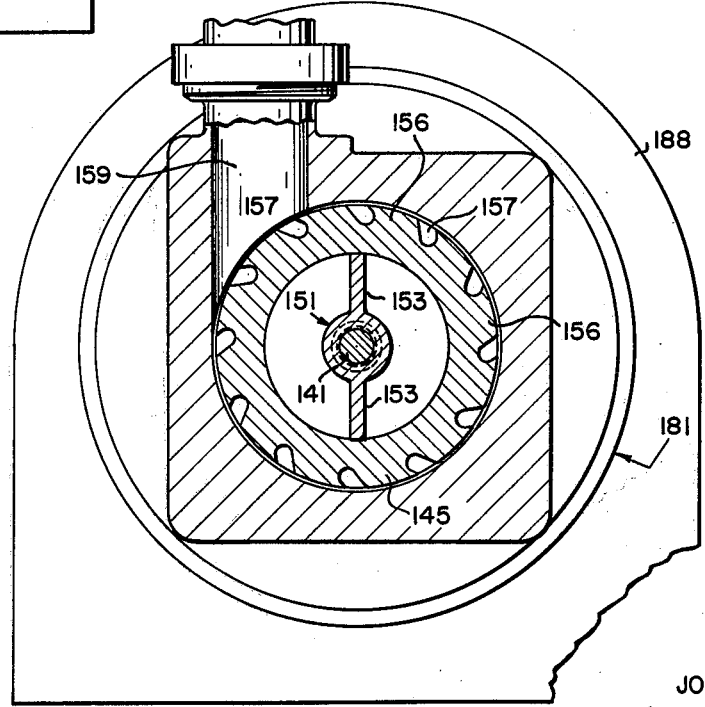

FIG. 8 is a cross sectional view taken along the line 8—8 of FIG. 7 and looking in the direction of the arrows; and FIGS. 9, 10 and 11 are schematic views illustrating merely by way of example, how the combined pumping and homogenizing apparatus made in accordance with this invention may be incorporated into a fluid system to provide selectively either a continuous, overhead or recirculating type of homogenizing operation.

Figure 1:
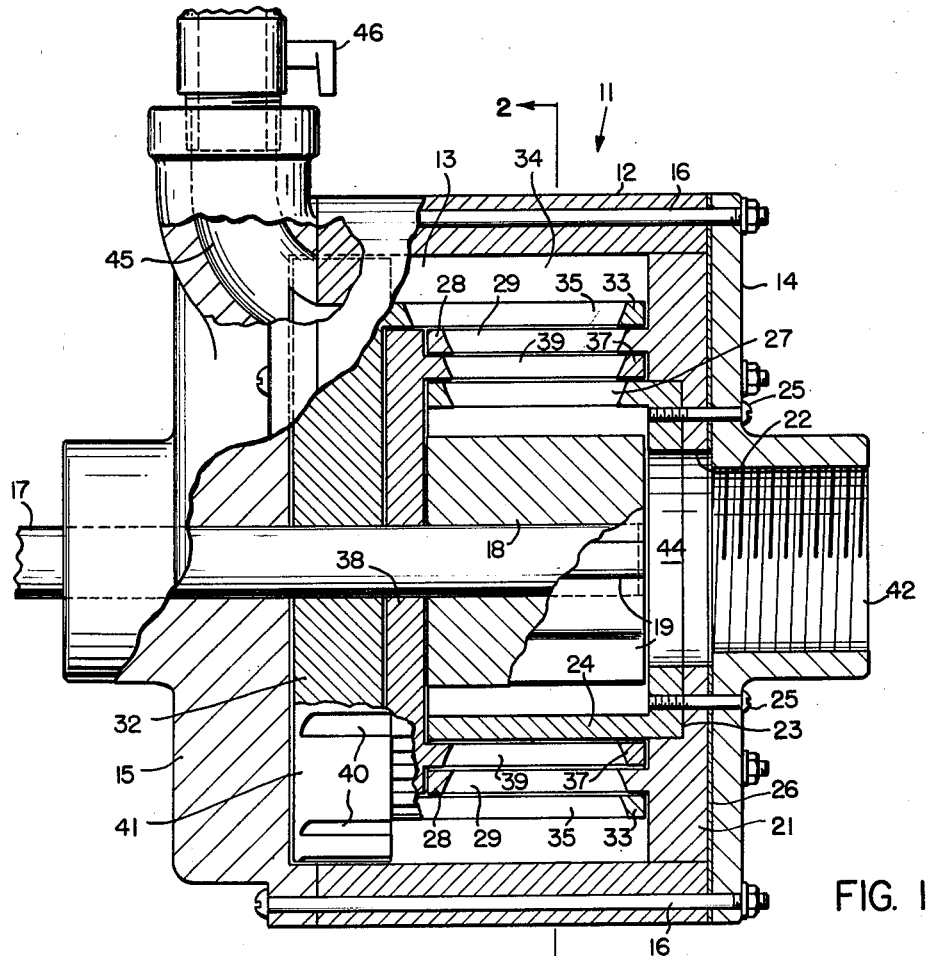
FIG. 1 is a part side elevational view, part axial section, showing a combination pump and homogenizing apparatus made in accordance with one embodiment of this invention.
Figure 2:
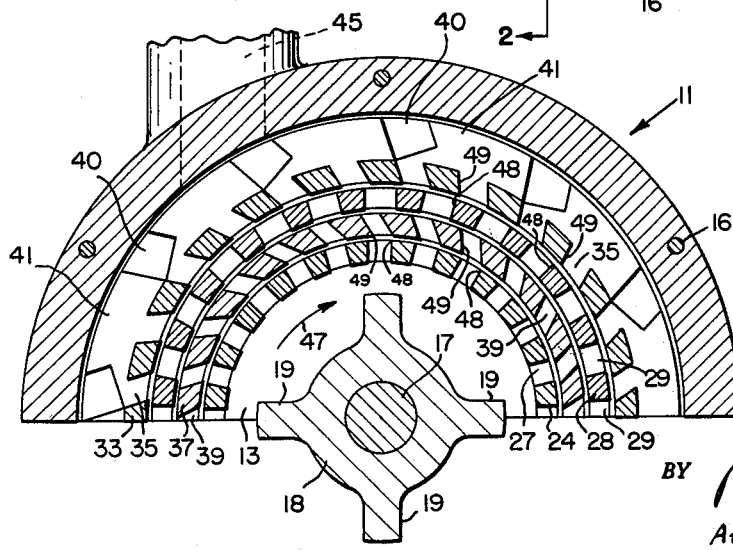
FIG. 2 is a fragmentary cross sectional view taken along the line 2—2 of FIG. 1, and looking in the direction of the arrows.

Referring now to the drawings by numerals of reference, and first to the embodiment illustrated in FIGS. 1 and 2, 11 designates the unit as a whole. The unit comprises an annular housing member 12, and cover plates 14 and 15 which close opposite ends of the housing member thereby defining a chamber 13 therein. The cover plates 14 and 15 and the annular housing member 12 are secured together by bolts 16.

Rotatably mounted in the plate 15 and extending into the interior of the chamber 13 formed by housing member 12 is a shaft 17. This shaft is adapted to be driven by an electric motor or the like (not illustrated). Removably secured in a stationary position on to the shaft 17 within chamber 13 is an elongate agitator or impeller 18 which has a hub portion secured to said shaft 17, and which has a plurality of radially projecting vanes 19.

Positioned coaxially in one end of annular wall member 12 between the cover plate 14 and the adjacent end of the agitator 18 is a circular stator disc 21 which has an axial bore 22. Secured in a counterbored recess 23 in stator disc 21 and extending outwardly therefrom into the chamber 13 concentrically about agitator 18 is a cup-shaped stator 24. Stator 24 and stator disc 21 are secured in chamber 12 by screws 25 to cover plate 14. A gasket 26 is interposed between cover plate 14 and the opposed face of stator disc 21. Stator 24 has an inside diameter which is slightly larger than the outside diameter of agitator 18. Stator 24 has axially extending slots 27 intermediate its ends which extend through its annular wall and which are equally spaced about the periphery of the stator. Slots 27 are coextensive longitudinally with the agitator vanes 19. The stator 21 has an annular wall 28 surrounding stator 24 which is formed with slots 29 intermediate the ends of this wall, and which are coextensive also longitudinally with the slots 27 of stator 24 and with the vanes 19 of agitator 18. Annular wall 28 extends from stator disc 21 inwardly of the chamber 13 at least as far as the inner, terminal end of stator 24.

Rotatably mounted in one end of chamber 13, the left hand end as viewed in FIG. 1, between the plate 15 and the adjacent end of the agitator 18 is an impeller 32. Impeller 32 is fastened on shaft 17. The impeller 32 has an annular wall 33 extending inwardly into the chamber 13 which is positioned coaxially about the outer stator wall 28 and which terminates at its inner end just short of the inner face of the stator disc 21. The inside diameter of wall 33 is slightly larger than the outside diameter of the wall 28. The outside diameter of wall 33 is quite a bit less than the inside diameter of chamber 13 to thereby define an annular space 34 between the rotor 33 and housing 12 which is several times as large as the spacing between the annular walls 28 and 33. Wall 33 has axially extending slots 35 which are equally spaced about the axis of impeller 32, and each of which is nearly coextensive in length with the agitator vanes 19.

Extending in spaced, concentric relation between the walls of the inner stator 24 and the outer stator 28 is the annular wall 37 of another cup-shaped rotor or shearing element 38. The element 38 is also secured to shaft 17 to rotate therewith. The inside face of the base of rotor 38 is slightly spaced from the inner end of the wall of the inner stator 24, and the base of rotor 38 seats substantially against the inner face of the impeller 32.

The inner end of the wall 37 of rotor 38 terminates short of the face of stator disc 21. The wall of the inner rotor 38 has axially extending slots 39 in it which are equally spaced about its axis and each of which slots is of a length coextensive with the agitator vanes 19.

To provide a primary centrifugal pumping effect for the homogenizer, the impeller 32 is formed with a plurality of peripherally spaced, axially extending notches 40 which define impeller blades 41.

The material to be homogenized is delivered to the unit through a port 42 centrally disposed in the end plate 14. This port is internally threaded to receive an end of the conduit through which the material is conveyed to the unit. Port 42 registers and communicates with registering ports 22 and 44 in the bases of stators 21 and 24, respectively. The fluid is exhausted from the unit through a duct 45 formed in end plate 15. Flow of the exhausting fluid is controlled by a rotary valve 46 mounted in a conduit which is threadably connected with duct 45.

In a pump constructed in the above manner, the stator and rotor shearing elements are nested in and alternate with one another.

In operation, when valve 46 is open, and shaft 17 is rotating in the direction of the arrow 47 (in FIG. 2) the material to be treated is drawn by impeller 32 through the inlet port 42, and successively through the axially-extending slots 27, 39, 29, 35 in the four shearing elements 24, 37, 28, 33 into the annular chamber space 34. Thence it is pumped by the impeller 32 out through duct 45. Flow of fluid through casing 11 may be halted without stopping shaft 17 merely by closing valve 46.

In the embodiment shown, the sides of stator slots 27 and 29 lie in parallel planes which are parallel to planes containing the axis of shaft 17; while the sides of each rotor slot 35, 39, although parallel to one another, are inclined to the sides of the slots 27, 29. The median planes of slots 39, 35 are skew, offset from the axis of shaft 17. As shown more clearly in FIG. 2, when the shaft 17 is rotating in the direction of the arrow 47, the edges at one outer corner of each slot 27, 29 of the stators 24, 21 constitute stationary shearing edges 48; and the confronting corners of the slots 35 and 39 constitute cooperating acute-angled, rotating shearing edges 49. Shearing edges 48 and 49 are in opposition to one another, and as fluid is drawn through the pump, the particles therein are initially sheared between the rotating agitator 18 and the inner corners at one side of slots 27 of the inner stator 24, and then further sheared by the cooperating edges 48 and 49 as they pass successively through the nested stators and rotors to the annular space 34 of chamber 12. Because of the manner in which they are slanted, rotor slots 35 and 39 also assist the pumping effect by imparting a centrifugal force to the liquid passing therethrough.

As liquid passes between the slots of a stator and an adjacent rotor, or vice versa, the particles in the liquid are subjected to an implosion resulting from the cavitation effect produced when the rotors 33, 37 are operated at high speeds. These high speeds create energy levels of ultrasonic sound waves measurable in kilocycles per second. Such energy levels between a respective stator and rotor have been found to be most effective when held within the range of 2.2 to 27.6 kilocycles per second. A suitable sound energy level, or frequency for a particular type of particle, i.e., a frequency at which the dispersion or reduction of particle size is optimum, may be achieved by varying the rotor speed, and/or, the number of slots in the rotors and stators. (Variation of the number of slots in a respective rotor or stator is normally accompanied by a corresponding variation in the width of the slots.) Further, by combining in alternation two rotors and two stators, as illustrated in the embodiment shown in FIGS. 1 and 2, the fluid is subjected to three different energy levels during its passage through the nested rotors and stators. The energy levels may be determined by the formula:

$$\frac{r.p.m. \times No.\ slots\ A \times No.\ slots\ B}{60}$$

where r.p.m. is the rotor speed in revolutions per minute, A the rotor, and B the stator; for the apparatus shown in FIGS. 1 and 2. When rotor 33, stator 28, rotor 37 and stator 24 have twenty-six, twenty-five, twenty-four and twenty-three slots, respectively, the energy levels between outer rotor 33 and stator 28, the stator 28 and inner rotor 37, and rotor 37 and inner stator 24 are 21.64; 20.0 and 18.4 kilocycles per second for a rotor speed of 2000 r.p.m. Reasonably good particle dispersion in milk or the like is afforded when the slot widths in the rotors and stators in the example given are ⅛".

Agitator 18, in addition to cooperating with inner stator 24 to produce the initial shearing, also serves as a preliminary flow volume and distributing control. As milk or the like enters inlet end 42 of the unit, the agitator vanes 19 tend to evenly distribute the milk relative to the inner stator 24 so that the flow is outward through the stator slots 27 and evenly across the slot shearing surfaces. As its speed of rotation is increased the agitator 18 will tend to increase the rate at which milk flows outwardly through the slots of the inner stator 24 thereby functioning in part as a preliminary flow volume control.

The rate of flow of milk through the shear pump directly affects the size of the particles which will be contained in the homogenized milk, i.e., the length of time that the product remains in the chamber has a direct relationship to the number of shearing actions that the product receives. Hence, the lower the rate of flow of milk through the shear pump, the greater will be the number of shearing actions that take place for a given volume of milk. Particle size may be decreased by throttling valve 46 thereby decreasing the rate of flow of milk through the pump, and vice versa, particle size may be increased by opening valve 46 to a greater degree.

Figure 3:
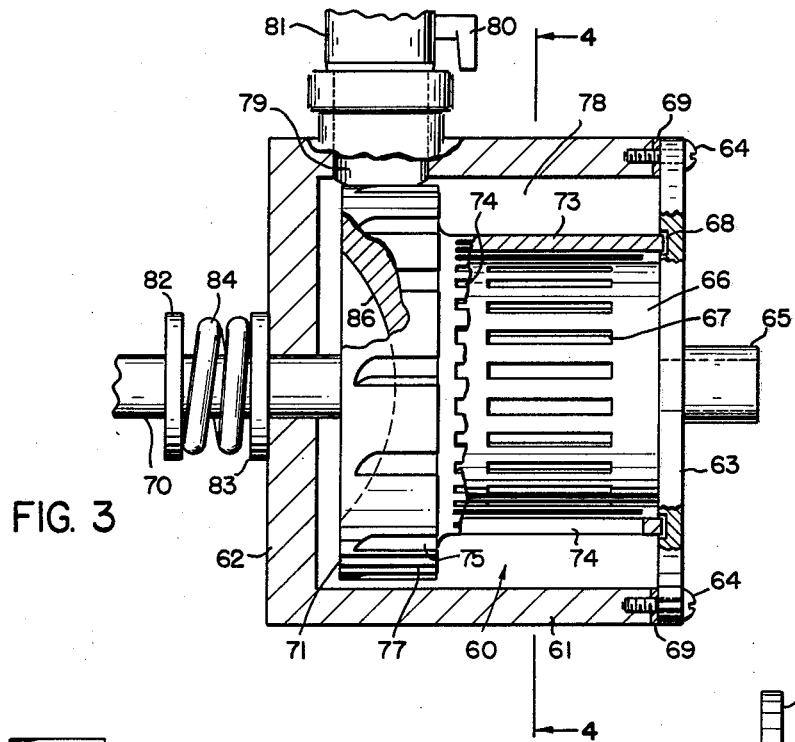
FIG. 3 is a part side elevational view, part axial section showing a combination pump and homogenizing apparatus made in accordance with a further embodiment of this invention.
Figure 4:
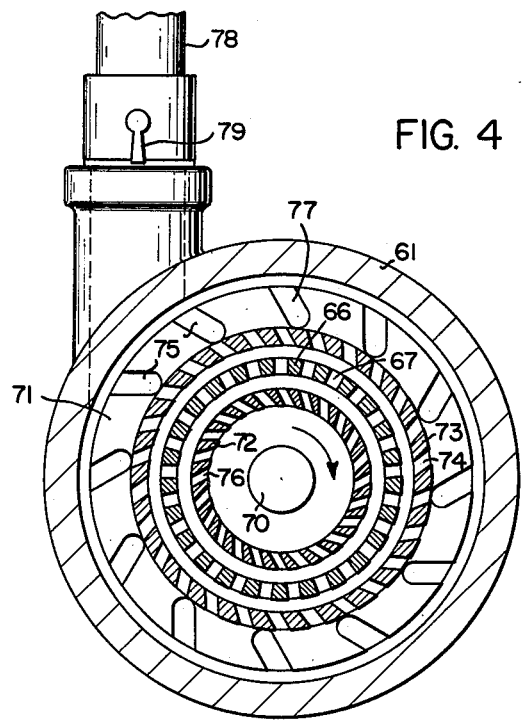
FIG. 4 is a transverse cross sectional view taken along the line 4—4 of FIG. 3 and looking in the direction of the arrows.

FIGS. 3 and 4 illustrate a modified form of the invention, which is designed to permit quick disassembly of the pump for cleaning; and which is designed to increase the number of shearing actions which take place in a given volume of fluid moving through the pump at a given rate. In this embodiment the pump casing forms a chamber 60 which is defined by a cup-shaped housing having an annular side wall 61 and an end plate 62 integral therewith. At its other end the housing is closed by a circular cover plate 63 which is removably secured to said annular wall 61 by screws 64 or the like. A gasket 69 is interposed between the end plate 63 and side wall 61. A bored coupling 65 secured to the outer face of cover plate 63 and an aligned aperture in plate 63 provide an inlet to the interior of the chamber 60 for the material to be treated.

Integral with the inner face of cover plate 63 and extending inwardly therefrom into the chamber 60 is a stator 66. The stator has an annular wall whose inner end terminates short of the inner face of end plate 62 at the opposite end of the chamber, and the stator is spaced radially from the annular wall 61. Stator 66 has axially extending shearing edges formed by axially extending slots 67 that are equally spaced about its axis. On its inner face, cover plate 63 has a circular slot or recess 68 which is concentrically positioned just outside of the outer peripheral surface of the wall of stator 66.

Rotatably mounted in the end plate 62 and extending into the interior of chamber 60 is a drive shaft 70, which is driven by a motor (not illustrated). Secured to shaft 70, and rotatably mounted within the chamber 60 adjacent to, but slightly spaced axially from the inner face of end plate 62 is a circular impeller disc 71. The inner face of impeller 71 terminates short of the inner end of the annular wall of stator 66. The impeller 71 is provided around its periphery with equi-angularly spaced notches 75 of relatively shallow radial depth and which extend for only part of the axial length of the impeller, terminating short of its rear end (left hand end as viewed in FIG. 3).

Integral with the impeller 71 and extending inwardly into the interior of chamber 60 are two rotors 72 and 73. Rotor 72 is cup-shaped and constructed in much the same manner as the inner rotor 37 employed in the embodiment illustrated in FIGS. 1 and 2. Rotor 72 is positioned concentrically inside of stator 66 and has shearing edges defined by axially extending slots 76 in its annular wall. Rotor 73 extends concentrically about the outer peripheral surface of stator 66 and the inner end of its annular wall registers with the circular slot 68 on the inner face of plate 63. Rotor 73 also has a plurality of axially extending shearing edges defined by axially-extending slots 74 that are equally spaced about the axis of rotor 73. The outside diameter of the annular wall of rotor 73 is less than the inner diameter of the annular chamber wall 61 to thereby define an annular chamber space 78 between rotor 73 and the wall 61.

Wall 61 has an exhaust port or duct 79 therethrough which connects chamber 78 with an exhaust pipe 81. A valve 80 is mounted in pipe 81 to control the flow of liquid through and from the pump.

Shaft 70 is mounted in end plate 62 to permit axial movement of both impeller 71 and rotor 73. Shaft 70 is constantly urged axially in one direction, to the left in FIG. 3, by a coil spring 84, which surrounds the shaft, and which is interposed between a disc 82, that is fixed to the shaft, and a sealing disc 83. Sealing disc 83 is disposed about shaft 70 and secured to the exterior face of end plate 62 to prevent leakage of liquid from the interior of the chamber 60 when shaft 70 is moved relative to the casing.

Under zero flow-rate conditions, i.e., when valve 80 is closed so that no liquid may flow out of the pump, liquid which is passed outwardly through stator 66 and rotor 73 to the annular chamber space 78 is recirculated back through the recess 68 between the inner terminal end of the wall of rotor 73 and cover plate 63 for a further shearing cycle.

The back of the impeller 71 is hollowed out slightly adjacent it scenter to define recess or pocket 86. When the valve 80 is open, the material will flow through the pump casing at a rate determined by the valve opening, but since flow of the material through the unit is always retarded sufficiently to secure reduction in particle size, some of the material will get behind impeller 71 and create a back pressure localized by pocket 86 against the rear face of impeller plate 71, thereby urging plate 71 and rotor 73 axially to the right of its position illustrated in FIG. 3. This motion urges the inner terminal end of the wall of rotor 73 into the circular slot 68 in cover plate 63, thereby decreasing the space between the inner end of the rotor wall and plate 63 and effectively limiting, and, with maximum valve opening, preventing recirculating flow of liquid in the pump casing.

Figure 5:
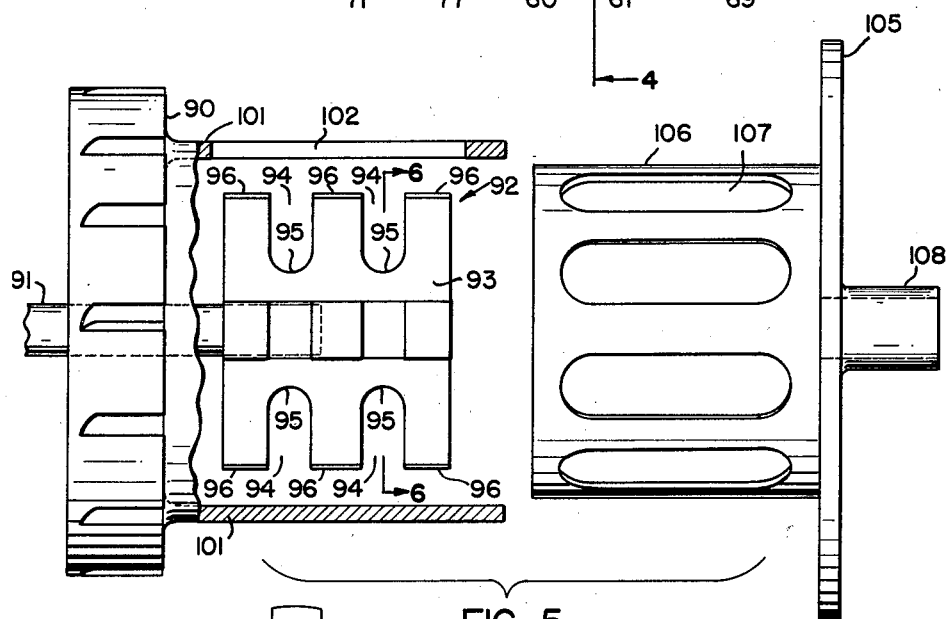
FIG. 5 is an exploded, part side elevation, part section, illustrating homogenizing elements which may be employed in apparatus constructed in accordance with a further modification of the invention.

While the axially slotted rotors and stators illustrated in the embodiments shown in FIGS. 1 to 4 prove satisfactory for the homogenization of milk, it may be desirable to employ a pre-grinding combination in the preparation of fruit slurries, nut ice cream mix, and similar materials containing lumpy dry products that must be uniformly blended. Such pre-grinding combination is illustrated in FIG. 5. Here the impeller is denoted at 90. It is secured to a drive shaft 91. Spaced slightly from the inner face of impeller 90, and removably secured to the shaft 91, is a chopping rotor 92. Rotor 92 extends axially beyond the inner end of shaft 91 and has four vanes 93 projecting radially from an integral central hub. Each of these vanes has two axially spaced notches 94 therein which extend parallel to one another inwardly from the outer terminal edge of a respective vane. Each of said notches 94 has a rounded bottom 95. Each vane thus provides three equally spaced chopping teeth 96.

The impeller 90 has an annular wall integral therewith and spaced concentrically about the outer surface of chopping rotor 92 which constitutes a finishing rotor 101. Rotor 101 extends slightly beyond the inner end of chopping rotor 92. Finishing rotor 101 has axially extending slots 102 equally spaced about its axis and extending through its annular wall to define axially extending shearing edges similar to those employed in the rotors disclosed in the embodiments illustrated in FIGS. 1 to 4.

Figure 6:
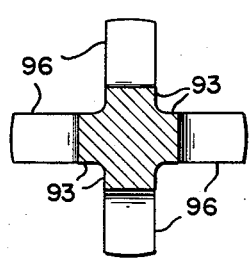
FIG. 6 is a cross sectional view taken on a reduced scale along the line 6—6 of FIG. 5 and looking in the direction of the arrows.

Adapted to nest between the chopping rotor 92 and the finishing rotor 101 is a stator 106. The stator 106 is integral with a circular cover plate 105, for the pump casing. Stator 106 extends inwardly from the inner face of cover plate 105 for a distance which is slightly greater than the length of the chopping rotor 92. Equally spaced about the axis of stator 106 are axially extending slots 107 which extend through the annular wall of stator 106 to define shearing edges similar to those employed in the stators illustrated in the embodiments shown in FIGS. 1 to 4. Cover plate 105 has an axially bored boss 108 to permit the admission of the material to be treated into the pump casing. When the stator 106 in FIG. 5 is nested between the rotors 92 and 101 in a homogenizing pump, the solid particles which enter through the inlet 108 are chopped by the rotating rotor 92 as they pass into the slots 107 of stator 106, and are again sheared or chopped as they pass out of stator 106 and through the slots 102 and the finishing rotor 101. To provide, successively, a coarse shearing step and then a fine shearing step, it is desirable that the slots in stator 106 be larger in width than the slots 102 in rotor 101. The rotor and stator assembly illustrated in FIGS. 5 and 6 is adapted to be mounted in a pump casing either of the type illustrated in FIGS. 1 and 2, or in FIGS. 3 and 4.

In FIGS. 7 and 8 another form of apparatus is illustrated. In this embodiment, a cup-shaped pump casing 121 is provided comprising wall portion 122 and an axially bored end wall 123. The open end of the cup-shaped pump casing 121 is closed by a circular cover plate 124 secured along its marginal portion to the end of annular wall 122 by means of conventional stud and wing nut combinations 125. Wall 122, end wall 123 and cover plate 124 cooperate to define an annular chamber 126 in the pump casing. A threaded coupling 129 integral with the cover 124 provides an axial duct 128 through which the material, which is to be treated, is delivered into the homogenizing unit.

Integral with the cover plate 124 and extending therefrom inwardly into the chamber 126 is a stator 130 which has peripherally spaced, axially-extending slots 131 that define shearing edges in the same manner as the stators disclosed in the embodiments illustrated in FIGS. 1 to 5.

Rotatably mounted intermediate its ends in end wall 123 is a shaft 141. One end of shaft 141 extends into chamber 126 where it has a first reduced diameter portion defining a shoulder 142. Mounted on the shaft 141 to seat against shoulder 142 is an impeller disc 145. Disc 145 has a circular recess in the outer face thereof which cooperates with a similar recess in the opposed face of end plate 123 to form a chamber 146. Disc 145 has an annular hub portion 147 extending inwardly from the other face thereof into chamber 126.

Integral with the impeller disc 145 and overlapping the stator 130 in closely spaced, concentric relation therewith, is a rotor 148 which has shearing edges defined by peripherally spaced, axially extending slots 149 similar to those employed in the rotors disclosed in the embodiments illustrated in FIGS. 1 to 5.

Impeller disc 145 is secured on shaft 141 by a double-bladed agitator 151 which has diametrically disposed blades 153, and a center tapped hub portion threaded on the inner end of shaft 141.

Agitator 151 has a diameter slightly less than the inside diameter of stator 130. Impeller disc 145 has an outer diameter slightly less than the inner diameter of wall 122.

The peripheral surface of impeller disc 145 is machined to provide a plurality of peripherally spaced notches 157 which define between them impeller blades 156. Notches 157 communicate with an annular chamber 158 defined by the space between the exterior of rotor 148 and the wall 122. An exhaust duct 159 is provided in the wall 122 of the casing. It communicates at one end with chamber 158 and at its other with an exhaust pipe controlled by a valve 160. The rate of exhaust from the unit may be controlled by valve 160 as in the case of the embodiments illustrated in FIGS. 1 to 5.

Shaft 141 at its other end extends exteriorly of end wall 123 and has an enlarged socket portion 161 that terminates in an outwardly directed annular flange 162, and that forms one part of a conventional coupling. Socket portion 161 has a frusto-conical recess or socket 163 in it.

Positioned in the recess or socket 163 is a frusto-conical coupling member 171 which is formed with an outwardly directed annular flange 172, which is axially spaced from, and approximately coextensive with flange 162 of coupling member 161. Coupling member 171 is fitted over and keyed to the armature shaft 189 of a motor 188. It is provided with two diametrically opposite slots 174 which extend axially of the coupling member 171 from its small end to a point adjacent the flange portion 172. Slots 174 divide the coupling member 171 into two oppositely disposed, resilient jaws that are semi-circular in cross section and that are adapted to frictionally engage the wall of socket 163 of coupling member 161. Coupling members 161 and 171 are also connected by screws 178 which pass through apertures in flange 162 and which are threaded into flange 172. These screws 178 permit limited axial movement between the coupling members and control their frictional engagement. Positioned about shaft 141 and secured to the exterior face of end wall 123 is a shaft lubricating annular seal 164. Surrounding shaft 141 and interposed between annular seal 164 and socket member 161 is a compression spring 165. Spring 165 acts to urge shaft 141 hence impeller disc 145 and its rotor 148 in an axial direction toward end plate 123.

As in the previously described embodiments of the invention, when the valve 160 is closed, the material in chamber 158 can recirculate through the chamber by way of circular recess 195 in end plate 124. When the valve 160 is open, the material may act through chamber 146 to force rotor 156-148 to the right in FIG. 7 against the resistance of spring 165 to close off recess 195.

For securing the homogenizing unit to the face of motor 188, an annular housing 181 is provided between the motor and end plate 123. End plate 123, therefore, has a boss 182 thereon which fits into an opening 183 in the housing to center the pump casing relative to the housing. The housing 181 is secured to the pump casing by conventional stud and wing nut combinations 187. At diametrically opposite sides, the side wall of housing 181 has two large openings 191 to permit access to the coupling 161–171, and to nuts 187. By adjusting screws 178 to permit shaft 141 to move slightly axially relative to coupling member 171, a slight axial movement of disc 145 is permitted.

FIGS. 9, 10 and 11 are illustrative of three different ways in which the combined pump and homogenizing unit of the present invention may be employed in association with a supply tank which contains the material which is to be homogenized. In each of FIGS. 9 to 11 a combination pump and homogenizing unit made in accordance with the present invention is designated at 201, and the tank employed for supplying the material which is to be homogenized is designated at 202. In each of FIGS. 9 to 11, the arrows illustrate the direction of flow of fluid in the system.

In the system illustrated in FIG. 9, fluid is supplied from the tank 202, through a pipe 203 to the input end of a homogenizing unit 201 which may be operated to pump a continuous supply of homogenized fluid out of its exhaust pipe 204. The pumping effect of unit 201 supplements any head afforded by supply tank 202.

In FIG. 10 the unit 201 is used to draw fluid through a pipe 205 from supply tank 202. The latter receives fluid from a supply pipe 206, and, unlike the system in FIG. 9, the tank 202 affords no head pressure to supplement the pumping effect of unit 201. This arrangement in particular shows the advantage achieved by the unit of the present invention. With conventional homogenizing or blending units, the paddle or particle reducing apparatus has to be submerged in the supply tank. The system in FIG. 10 is particularly handy when it is necessary to pump fluid from an underground tank or the like.

In FIG. 11 fluid from supply tank 202 is admitted through pipe 207 to the unit 201 from whence it is pumped back to tank 202, in homogenized form, through pipe 208. Thus a recirculating effect can be achieved to insure maximum blending and uniformly of particle size.

In each of the embodiments illustrated in FIGS. 1 to 8 it is to be understood that the rotors and pump impellers are removably positioned on the shafts with which they rotate, so that they may be replaced by similar but different parts if desired. For instance, the agitator 18 of the embodiment in FIG. 1 could be replaced by a chopper similar to the chopping motor 92 of FIG. 5 or by the agitator blade 151 of FIG. 7. Moreover even the stators may be interchanged, for instance, by employing in lieu of the cover plate 63 and its stator 66 as illustrated in FIG. 3, a similar cover plate, but one having a stator with slots similar to those shown at 107 in FIG. 5. Further, it has been noted that when the rotors, stators, and pump casing are made from stainless steel, there is less tendency for fluids to congeal or otherwise build up objectionable deposits or residues in the chamber; and upon completion of the homogenizing process the unit is easily and expeditiously cleaned merely by permitting a quantity of water to be pumped through the unit. For a more thorough cleaning and inspection of the unit, the end walls of the pump casing that carry the stators are readily removed without interfering with the impeller and rotor elements of the unit. It is thus apparent that applicant has provided an efficient, compact and relatively inexpensive homogenizing unit that is far more readily adaptable to various fluid systems than is the open, paddle tank type of homogenizer.

Having thus described my invention, what I claim is:

1. Apparatus for homogenizing fluids containing particles comprising a casing having an annular wall and closed at both its end to define a chamber which is internally circular in cross section, rotatable drive means extending into said chamber, a pump member rotatably mounted coaxially of said chamber in one end thereof and connected to said drive means for rotation therewith, a plurality of concentrically nested annular shearing elements extending axially of said chamber between said pump member and the opposite end of said chamber, at least one of said shearing elements having the end thereof adjacent said pump member secured to said drive means for rotation therewith and having its other end slightly spaced axially from said opposite end of said chamber, and at least the next adjacent radially of said shearing elements being fixed in said chamber with one end thereof secured to said opposite end of said chamber and its other end slightly spaced axially from said pump member, each of said shearing elements having a plurality of peripherally spaced, axially extending slots therethrough, a fluid inlet port in said casing communicating with the interior of the innermost of said nested shearing elements, and a fluid outlet duct in said casing adjacent said pump member, whereby upon rotation of said drive means said pump member is operative to pump fluid radially outwardly from the interior of said innermost element and through the slots in said nested elements to said outlet duct, and whereby the slots in said one element are rotated relative to the slots in said next adjacent element so that particles in said fluid will be sheared upon passing between a respective slot in said fixed shearing element and a rotating slot in said rotating element, said drive means comprising a shaft rotatably mounted in said casing at said one end of said chamber, said shaft being movable axially toward and away from said opposite end of said chamber, whereby said one shearing element secured to said shaft is movable axially with said shaft toward and away from said opposite chamber end to thereby decrease or increase, respectively, the space between said opposite chamber end and said other end of said one element.

2. Apparatus as defined in claim 1 including spring means interposed between said shaft and said casing to constantly urge said shaft and said one element axially in a direction away from said opposite chamber end, and wherein said pump member is secured on said shaft intermediate said one element and said one end of said chamber and has a recess in the side thereof confronting said one end of said chamber, said fluid being operative upon its flow through said chamber at a predetermined rate to create a back pressure against the recessed side of said pump member sufficient to overcome said spring means and to move said pump member, said shaft, and said one element secured thereto in a direction axially toward said opposite chamber end.

3. Apparatus as defined in claim 1 wherein said shaft has one end thereof extending through said pump member coaxially of said chamber, an agitator is mounted on said one end of said shaft for rotation concentrically in said innermost element, and said agitator has a plurality of radial vanes equi-spaced about its axis.

4. Apparatus as defined in claim 3 wherein each of said vanes has axially spaced recesses therein, said recesses extending from the peripheral terminal edges of said vanes, inwardy toward the axis of said agitator.

5. Apparatus as defined in claim 1 wherein each of the sidewalls of the slots in said one element is inclined from its radially outer end to its radially inner end in the direction of rotation of said one element thereby to impart a centrifugal pumping effect to the fluid passing therethrough.

6. Apparatus for homogenizing fluids containing particles, comprising a hollow casing having an internal annular wall and closed at its ends to define a chamber, at least one annular element rotatably mounted in said chamber in radially spaced, coaxial relation to said annular wall, a rotatable, circular pump member mounted in one end of said chamber intermediate one end of said rotatable element and said one chamber end and having on its periphery a plurality of angularly spaced impeller blades which extend into the annular space between said annular wall and said one element, the other end of said rotatable element being slightly spaced, axially, from the opposite end of said chamber, at least one stationary annular element secured at one end to said opposite chamber end and extending outwardly therefrom coaxially into the interior of said rotatable element in closely spaced, coaxial relation therewith, drive means extending into said chamber at said one chamber end operable to rotate said pump means and said rotatable element, an inlet port in said casing communicating with the interior of said stationary element, each of said annular elements having a plurality of slots in its annular wall, and said casing having a fluid exhaust port for said chamber adjacent said pump member and communicating with said annular space, whereby upon rotation of said drive means said pump member is rotated to pump fluid from the interior of said stationary element and radially outwardly through said slots in said elements to said annular space at the exterior of said rotatable element before passing to said exhaust port, and the slots in said rotatable element are rotated past the slots in said stationary element to thereby shear particles in the fluid passing between said elements, said drive means comprising a shaft rigidly connected to said rotatable element and mounted in said casing for rotational and axial movement relative to said casing, means interposed between said shaft and said casing and operative to urge said shaft and said rotatable element in a direction away from said opposite chamber end to permit recirculation of said fluid from the exterior of said rotatable element to the interior thereof through said slight axial space, and means operative upon a decrease in the rate of flow of fluid through said casing to move said shaft and said rotatable element connected thereto toward said opposite chamber end to thereby decrease said slight axial space between said rotatable element and said opposite chamber end.

7. Apparatus as defined in claim 6 wherein said shaft extends coaxially into the interior of said stationary element, said pump member is secured coaxially to said shaft for rotation therewith, a fluid agitator is secured to said shaft and rotatable therewith within said stationary element intermediate the ends thereof, and said agitator has a plurality of equi-angularly spaced radial chopping blades.

8. Apparatus as defined in claim 6 wherein said slots in said elements are peripherally spaced and extend axially intermediate the ends of said elements, each of said slots in said rotatable element having sides slanted from their radial outer to their radial inner ends in the direction in which said rotatable element is adapted to be rotated, whereby said slots in said rotatable element form a plurality of particle shearing edges at the inner peripheral surface of said rotatable element to cooperate with shearing edges formed on the outer surface of said stationary element by its slots.

9. Apparatus for homogenizing fluids containing particles comprising a hollow casing having an annular wall closed at its ends to define a chamber, a shaft rotatably mounted in said casing at one end of said chamber and having one end thereof extending into said chamber coaxially of said annular wall, fluid agitating means secured to said shaft intermediate the ends of said chamber, pumping means secured to said shaft intermediate said agitating means and said one end of said chamber, a stationary, annular element disposed closely about said agitating means and having one end secured to the end of the chamber opposite said one end, and having its other end slightly spaced from said pumping means, a rotatable annular element disposed closely about said stationary element and having one of its ends secured to said pumping means and the other of its ends spaced slightly from said opposite chamber end, said rotatable element and said annular wall defining an annular space therebetween, spring means interposed between said shaft and said casing and operative to urge said shaft, said pumping means, and rotatable element in an axial direction away from said opposite chamber end, said casing having a fluid inlet opening at said opposite chamber end communicating with the interior of said stationary element, and an exhaust port adjacent said one chamber end and communicating with said pumping means, said annular elements having spaced apertures therein, whereby upon rotation of said shaft, said pumping means is operative to cause fluid to flow from within said stationary element and outwardly through said apertures to said annular space and said exhaust port, and the apertures in said rotatable element are rotated past the apertures in said stationary element to thereby shear particles in the fluid passing between apertures in said rotating and stationary elements, respectively.

References Cited by the Examiner

UNITED STATES PATENTS

| 1,630,406 | 5/27 | Prillwitz | 259—96 |
| 2,321,599 | 6/43 | Hofmann | 259—7 X |
| 2,637,537 | 5/53 | Ernst | 259—96 |
| 2,882,149 | 4/59 | Willems | 259—96 X |

FOREIGN PATENTS

| 567,150 | 5/58 | Belgium. |
| 1,255,231 | 1/61 | France. |
| 505,900 | 12/54 | Italy. |

WALTER A. SCHEEL, *Primary Examiner.*

J. S. SHANK, LEO QUACKENBUSH, *Examiners.*